United States Patent [19]
Hager

[11] 3,738,238
[45] June 12, 1973

[54] PHOTOGRAPHIC APPARATUS WITH MEANS FOR OBSTRUCTING THE PASSAGE OF LIGHT THROUGH THE VIEWFINDER

[75] Inventor: Klaus Hager, Stuttgart, Germany

[73] Assignee: Robert Bosch Photokino GmbH, Stuttgart, Germany

[22] Filed: Apr. 1, 1971

[21] Appl. No.: 130,286

[30] Foreign Application Priority Data
Apr. 2, 1970 Germany.................. G 70 11 932.3

[52] U.S. Cl................................................ 95/11 V
[51] Int. Cl..................................................... G03b
[58] Field of Search........................... 95/11 V, 11 R

[56] References Cited
UNITED STATES PATENTS
3,427,943  2/1969  Leibundgut......................... 95/11 R FOREIGN PATENTS OR APPLICATIONS
1,188,600  4/1970  Great Britain...................... 95/11 V Primary Examiner—Samul S. Matthews
Assistant Examiner—Kenneth C. Hutchison
Attorney—Michael S. Striker

[57] ABSTRACT

The eyecup which surrounds the eyepiece of the viewfinder in a reflex camera has an elastic extension provided with a plug which can be fitted into an opening in the rear of the eyepiece to prevent entry of light into the viewfinder. The plug has a handgrip portion which can be grasped by fingers to facilitate its withdrawal from or insertion into the opening.

5 Claims, 2 Drawing Figures

PATENTED JUN 12 1973 3,738,238

3,738,238

PHOTOGRAPHIC APPARATUS WITH MEANS FOR OBSTRUCTING THE PASSAGE OF LIGHT THROUGH THE VIEWFINDER

BACKGROUND OF THE INVENTION

The present invention relates to photographic apparatus in general, particularly to reflex cameras, and more particularly to improvements in devices for obstructing the passage of light through the viewfinder. Still more particularly, the invention relates to light obstructing devices which can be actuated to assume a position in which they prevent entry of light through the eyepiece of the viewfinder into the camera.

In presently known cameras, the device which obstructs the passage of light into the camera comprises an opaque disk which is mounted in the interior of the camera body and is movable across the light path in the viewfinder in response to actuation of a knob which is accessible from without the housing. Such light obstructing devices are expensive and necessitate the provision of specially designed viewfinders. Thus, a viewfinder which is to permit movement of the opaque disk to and from the operative position must be designed to provide room for the movements of the disk. Furthermore, the housing of the camera must be provided with bearings and pivot means for the disk as well as with openings or slots which permit the disk to move across and from the light path in the viewfinder.

Another drawback of presently known light obstructing devices is that the user must look into the eyepiece of the viewfinder in order to determine whether or not the disk is located in the operative position. If the disk is located in such position when it should not obstruct the passage of light or is out of operative position when it is desirable to prevent light which enters through the viewfinder, valuable time might be lost for moving the disk to or from the operative position.

SUMMARY OF THE INVENTION

An object of the invention is to provide a simple, reliable and inexpensive device which can be moved to an operative position in which it prevents entry of light through the eyepiece of the viewfinder into the camera.

Another object of the invention is to provide a manually operable light obstructing device which does not necessitate any changes in the design and/or dimensions of the body of a photographic apparatus and which can protect the sensitive parts of the viewfinder.

A further object of the invention is to provide a light obstructing device which can be readily mounted on existing still cameras or motion picture cameras.

An additional object of the invention is to provide a light obstructing device which can be seen at all times so that the operator can determine its position without having to look into the eyepiece of the viewfinder.

Still another object of the invention is to provide a light obstructing device which does not necessitate any changes in the presently known types of viewfinders for photographic apparatus, particularly for reflex cameras.

The invention is embodied in a photographic apparatus, particularly in a reflex camera, which comprises a housing or body, a viewfinder provided in or on the housing and having an eyepiece, a light obstructing device movable to and from an operative (light-obstructing or eyepiece-concealing) position in which it is outwardly adjacent to the eyepiece, and connecting means movably securing the light obstructing device to the housing. The connecting means may include a conventional eyecup which surrounds the eyepiece to prevent entry of light when the eye of the user of the camera is located behind the eyepiece of the viewfinder. The eyecup preferably consists of rubber or other elastomeric material and has an extension provided with a plug forming part of light obstructing device and being insertable into an opening of the tubular mount for the eyepiece. The light obstructing device may further comprise a handgrip portion which facilitates insertion or withdrawal of the plug from the opening behind the eyepiece.

The novel features which are considered as characteristic of the invention are set forth in particular in the appended claims. The improved light obstructing device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
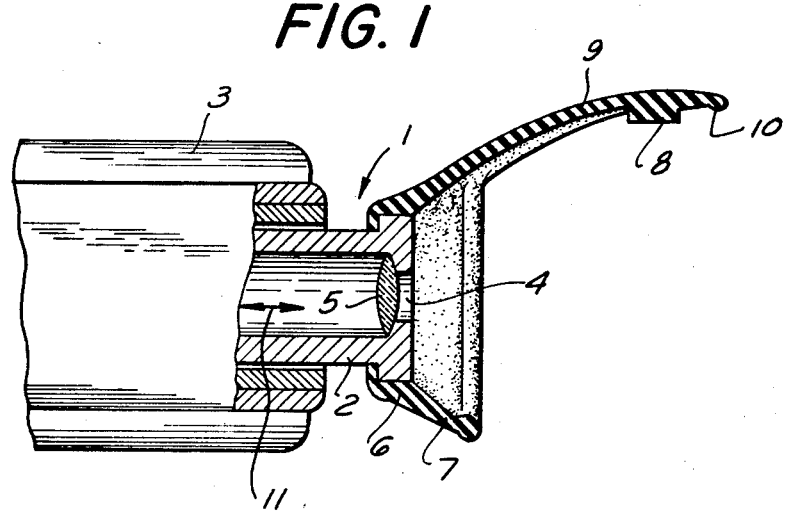
FIG. 1 is a fragmentary plan view of a photographic apparatus with the rear portion of the viewfinder shown in horizontal section, the light obstructing device being illustrated in the inoperative position.

The drawing illustrates a portion of a photographic apparatus, preferably a reflex camera, which includes a housing or body 3. The viewfinder 1 is mounted in the body 3 and comprises a tubular mount 2 which is adjustable axially as indicated by the double-headed arrow 11. The rear portion of the lens mount 2 accomodates an eyepiece 5 which is located in front of an opening 4 serving to admit light into the eye of the user of the camera. The opening 4 is provided in a ring-shaped flange 6 forming part of the lens mount 2 and serving as support for the smaller-diameter portion of a conventional annular eyecup 7. This eyecup serves to prevent entry of light from the sides when the eye of the observer is placed into the cup close to and behind the opening 4.

In accordance with the present invention, the eyecup 7 constitutes a component of a connecting means which movably secures to the housing 3 a light obstructing device or cover including a plug 8 and a handgrip portion or flap 10. In accordance with a more specific feature of the invention, the light obstructing device is integral with the eyecup 7. To this end, the eyecup 7 comprises an elastic extension or arm 9 which is integral with the plug 8 and normally tends to assume the unstressed position shown in FIG. 1. The light obstructing device is then out of the way and does not interfere with the placing of a portion of the user's eye into the opening of the eyecup 7. The parts 7, 8, 9, 10 preferably consist of rubber or other suitable elastomeric material, and the eyecup 7 can be slipped onto and separated from the flange 6.

Figure 2:
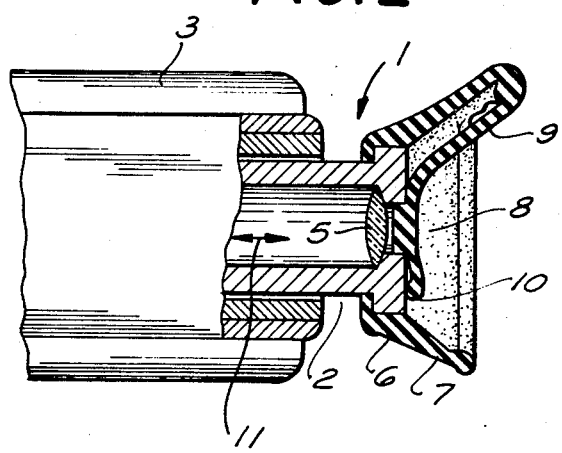
FIG. 2 illustrates the structure of FIG. 1 but with the light obstructing device shown in operative position.

When the user of the camera wishes to prevent light from entering the eyepiece 5 of the viewfinder 1, the flap 10 is grasped by fingers and is manipulated to forcibly introduce the plug 8 into the opening 4 so that the plug is held in the lens mount 2 with at least some friction. This is shown in FIG. 2. The diameter of the plug 8, in unstressed condition of its material, exceeds the diameter of the opening 4. The user of the camera can see that the extension 9 is deformed, i.e., that the plug 8 is located in the opening 4, so that it is not necessary to actually look into the eyecup 7 in order to determine whether or not the light obstructing device dwells in the operative position. This can save time when it is necessary to make one or more exposures without any delay.

When the user wishes to return the light obstructing device to the inoperative position of FIG. 1, the flap 10 is grasped by fingers and is moved in a direction to withdraw the plug 8 from the opening 4. If the flap 10 is thereupon released, the extension 9 automatically reassumes the position which is shown in FIG. 1 and the user is free to look into the eyepiece 5.

An advantage of the improved light obstructing device is that it occupies no room in the interior of the housing. Furthermore, the light obstructing device can be applied to existing cameras and its cost is but a small fraction of the cost of a conventional light obstructing device which is mounted in the interior of the camera housing. The elasticity of the connecting means 7, 9 for the light obstructing device insures that the latter is automatically held out of the way when its plug 8 is not received and frictionally held in the opening 4 of the lens mount 2. Thus, the user of the camera need not be concerned with the light obstructing device when the plug 8 need not extend into the opening 4; the plug then automatically assumes the inoperative position of FIG. 1. A further advantage of such mounting of the light obstructing device that the plug 8 can be placed behind (i.e. outwardly of) the eyepiece 5 is that, when it is introduced into the opening 4, the plug prevents dust, moisture or other foreign matter from reaching the sensitive parts of the viewfinder 1. Also, the plug 8 then prevents accidental damage to the eyepiece 5.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a photographic apparatus, particularly in a reflex camera, a combination comprising a housing; a viewfinder provided in said housing and including a tubular mount and an eyepiece provided in said mount, said mount having an opening outwardly adjacent to said eyepiece; a light obstructing device movable to and from an operative position in which said light obstructing device is outwardly adjacent to said eyepiece and registers with said opening; and connecting means movably securing said light obstructing device to said housing, said connecting means comprising an eyecup at least partially surrounding said opening and including an elastic extension supporting said light obstructing device and being deformable to allow for movement of said light obstructing device to said operative position.

2. A combination as defined in claim 1, wherein said extension is integral with said light obstructing device and with said eyecup and said device comprises a plug which extends into said opening in the operative position of said device.

3. A combination as defined in claim 2, wherein said device further comprises a handgrip portion provided on said plug to facilitate manual insertion or withdrawal of said plug from said opening.

4. A combination as defined in claim 1, wherein said light obstructing device consists at least in part of elastomeric material and is frictionally held in said opening of said mount in the operative position of said light obstructing device.

5. A combination as defined in claim 1, wherein said connecting means and said light obstructing device consist of rubber.

* * * * *